1,734,256

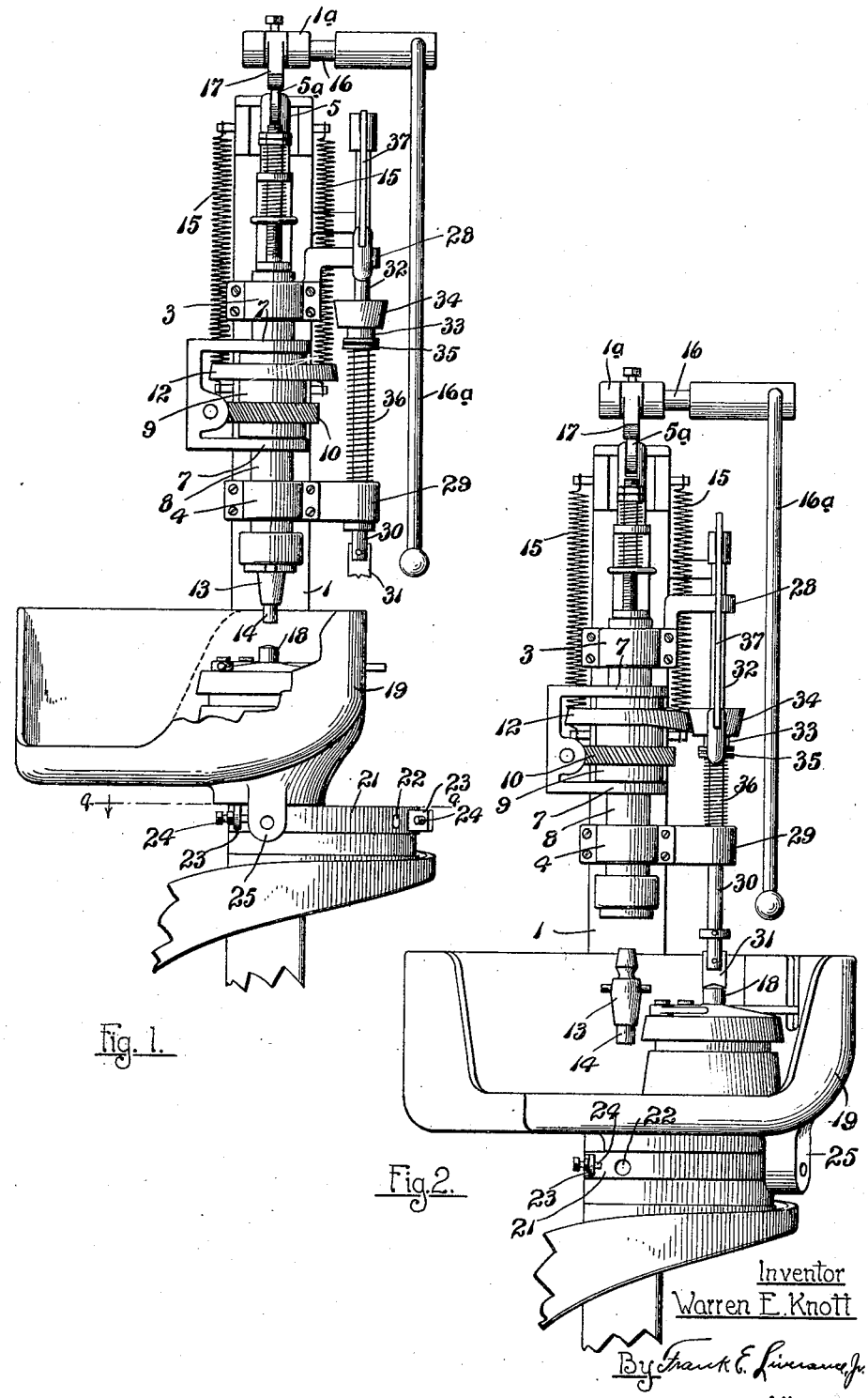

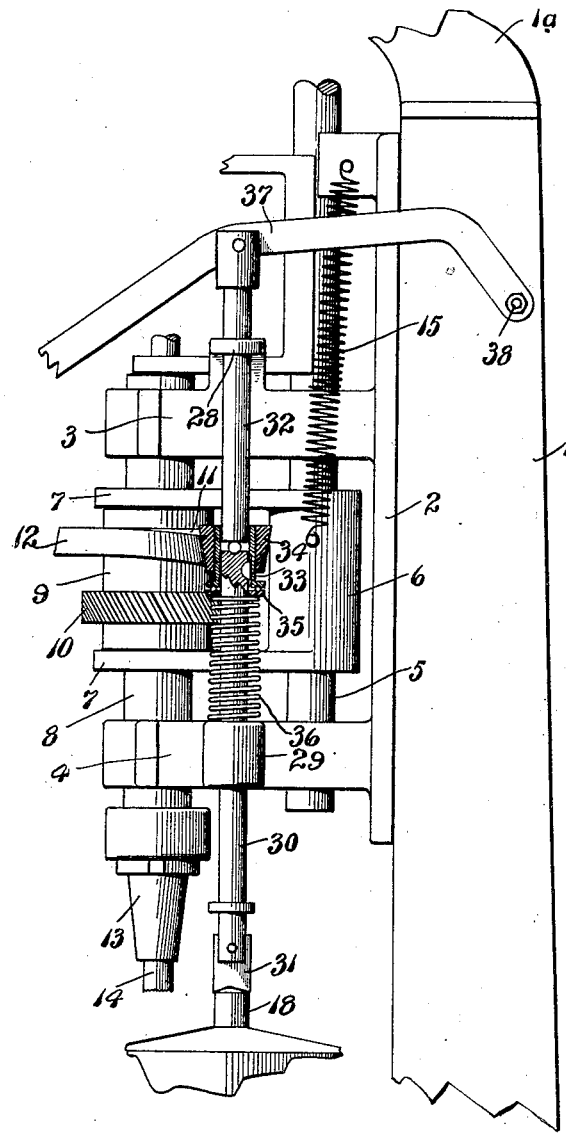
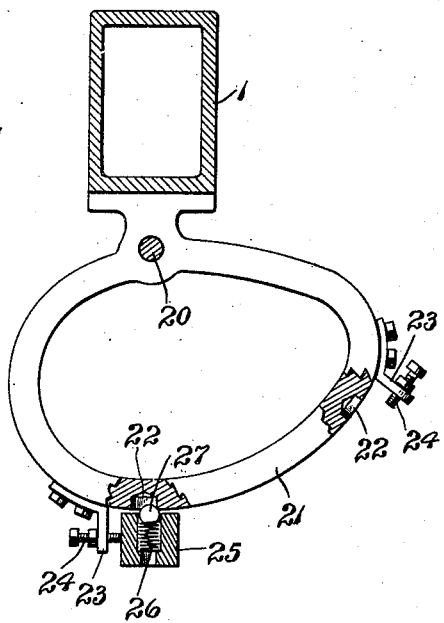
Fig.3.
Fig.4.
Inventor
Warren E. Knott
By
Frank E. Liverance, Jr.
Attorney Patented Nov. 5, 1929

UNITED STATES PATENT OFFICE

WARREN E. KNOTT, OF GRAND RAPIDS, MICHIGAN, ASSIGNOR TO PIONEER PEARL BUTTON COMPANY, OF POUGHKEEPSIE, NEW YORK, A CORPORATION OF NEW YORK

PLUG DRESSER

Application filed May 11, 1927. Serial No. 190,405.

This invention relates to a plug dressing appliance adapted to and used in connection with a button blank sawing machine. I have heretofore obtained U. S. Patent No. 1,472,275, issued October 30, 1923 on a button blank saw machine, wherein the saw is positioned at the lower end of a rotating shaft or arbor and is moved downwardly so as to bring it into sawing engagement with the shell from which the blank is to be cut. The shell is supported on a plug, usually of wood, and as the blanks are sawed from the shell the saw passes through the shell and cuts into the supported plug. After a number of operations the upper end of the plug must be dressed in order to provide the necessary and proper supporting surface for the shell. Moreover the saws become dull after a number of operations and it is necessary to remove the same for sharpening and resetting.

In the present invention I have provided a means for dressing the upper ends of the plugs in button blank sawing machines of the character described, the plug being dressed whenever a saw is removed for treatment, such as sharpening or setting. In order to remove the saw for this treatment the plug is swung to one side and out of the way so that the saw and the chuck member to which it is attached may be removed in a downwardly direction. When thus moved to one side the plug comes underneath a dressing tool which is mounted for rotation on a shaft, in turn supported adjacent the rotating arbor which carries the saw during the operation of the machine. By manual operation of a suitable friction drive associated with said shaft and which may be brought into driving connection with the arbor the shaft carrying the dressing tool is driven and the tool rotated and moved downwardly so as to dress and smooth the upper end of the supporting plug.

A construction, whereby these operations are performed practically and efficiently, is described in the following description and shown in the accompanying drawings, in which, Fig. 1 is a front elevation of the button blank sawing machine with the plug dressing attachment thereon, parts being broken away to disclose the plug.

Fig. 2 is a similar elevation showing the plug swung to one side, the chuck member to which the saw is attached removed from the arbor, and with the dressing tool in engagement with the upper end of the plug.

Fig. 3 is a fragmentary side elevation of the upper part of the construction shown in Figs. 1 and 2, certain parts being in section to show their construction, and Fig. 4 is a horizontal section, substantially in the plane of line 4—4 of Fig. 1.

Like reference characters refer to like parts in the different figures of the drawings.

A main supporting post or pedestal 1 is used at the upper end of which a head $1^a$ is fixed, the same extending upwardly and forwardly. At the front side of the upper portion of said post a fixture for carrying the mechanism is secured, comprising a vertical base plate 2 from which two spaced apart upper and lower arms 3 and 4 extend horizontally forward. At their front ends said arms are equipped with bearings in which the saw carrying arbor is rotatably and slidably mounted. A rod 5 lies in front of the plate 2 and is mounted for vertical movements to which, between the arms 3 and 4, a sleeve 6 is permanently secured. A housing having upper and lower sides 7 is formed integrally with the sleeve 6 and extends in a forward direction therefrom. The arbor 8 which passes through the bearings at the front ends of the arms 3 and 4 also passes through said upper and lower sides 7 of the housing. The arbor between said sides 7 of the housing is enlarged and made of greater diameter, as indicated at 9, and is equipped with a spiral gear 10 by means of which the arbor is driven by suitable cooperating gearing in turn connected with any suitable source of power. Above the gear 10 a ring 11 is fixed to the enlarged portion 9 of the arbor and is covered by an elastic band 12, preferably of rubber. The ring 11 is of the cone type, that is, its outer surfaces extend downwardly and outwardly with respect to the vertical.

At the lower end of the arbor a chuck for detachably connecting the button blank saw is provided. The specific construction thereof is not shown in the present application as it forms a subject matter of a pending application for patent filed by me August 10, 1925, Serial No. 49,170. A detachable chuck member 13 engages with the chuck member made at the lower end of the chuck member of the arbor to which a cylindrical button blank saw 14 is secured at its lower end.

Normally the arbor is held in an upper position through tension springs 15 which are attached at their lower ends to the sleeve 6 and at their upper ends to a lug extending forward from the base plate 2. The effect of said springs is to normally elevate the arbor and also the rod 5, which at its upper end, is equipped with a roller 5a (see Figs. 1 and 2). A shaft 16 is rotatably mounted on the head 1a of the pedestal, has a handle 16a for manual rocking of the shaft and a cam 17 which lies directly over and in engaging contact with the roller 5a. Drawing downward on the handle moves the rod 5, the arbor 8 and the saw 14 in a downward direction against the the resistance of springs 15 but as soon as the handle is released said springs elevate the parts to upper position.

The supporting plug 18, usually of wood, on which the shells sawed by the saw 14 are placed is mounted on and carried by a fixture, indicated as a whole at 19. This fixture can be swung about the vertical axis of the rod 20, shown in Fig. 4, over a member 21 of the shape shown in Fig. 4 which is rigidly attached to the pedestal 1. The member 21 has an outer section concentric with the pin 20 in which two spaced apart recesses 22 are made. A bracket 23 is attached to the member 21 adjacent each recess and each of the brackets 23 has an adjustable screw 24 mounted therethrough as shown in Fig. 4. A lug 25 extends downwardly from the fixture 19 and is movable between the inner ends of the screws 24, its movements being limited by its engagement against ends of the screws, which of course may be adjusted to different positions. An opening is made at the inner side of the lug in which a spring 26 is seated and against the inner end of which a ball 27 bears. This ball is adapted to engage against the face of the member 21 and to enter the recesses 22 therein so as to releasably hold the fixture 19 in either one of two extreme positions to which it can be moved. The ball is smaller in diameter than the diameters of the recesses 22 thus permitting a limited amount of adjustment and yet still serve the purpose of holding the fixture 19 in either position.

From the arms 3 and 4 previously described, other arms 28 and 29 extend to one side. A shaft 30 passes through the end of arm 29 and is rotatably mounted therein, at its lower end being equipped with a dressing tool 31. A rod 32 passes through the arm 28 and at its lower end enters the upper end of the sleeve 33 which is keyed to the upper end of the shaft 30. On the sleeve 33 a friction drive pulley 34 is secured also of the cone type with its taper or inclination downward and inward. The lower end of the sleeve 33 is flanged and below the flange a disk or washer 35 is disposed around the shaft 30 with suitable ball bearings between the flange and disk. A coiled compression spring 36 is located around the shaft 30 between said disk 35 and the upper side of the arm 29. The tendency of the spring is to elevate the shaft 30 and the rod 32. A handle 37 is pivotally connected at one end at 38 to the pedestal 1 and between its ends is pivotally connected to the upper end of the rod 32.

It is evident that when the handle 37 is drawn in a downward direction shaft 30 is moved downwardly against the force of spring 36 and the pulley 34 brought into operative engagement with the band 12 around the ring 11. Inasmuch as the arbor 8 on which the ring 11 is mounted is rotated continuously, when this engagement occurs shaft 30 is rotated and the dressing tool 31 at its lower end rotated with it.

In one position of the fixture 19, that shown in Fig. 1 and indicated in Fig. 4, the plug 18 is directly below the saw 14 and serves to support shells from which blanks are to be cut by the saw. In the other position of the fixture, that shown in Fig. 2, the plug has been moved out from under the saw 14 and the chuck member to which it is attached is shown removed for treating the saw. At the same time the plug has been brought directly under the dressing tool 31. By pulling downwardly on the handle 37 the tool is brought against the upper end of the plug and the plug dressed. It will be noted that the elastic band 12 by reason of its elasticity and the taper of the ring 11 on which it is placed, may creep in a downward direction on the ring under the frictional engagement of the pulley 34, this permitting the necessary leeway in dressing the plug or in dressing it a few times before the plug is vertically adjusted.

This construction of machine and dressing attachment therefor is very practical and effective and has proved valuable in practice. Various changes in detail of construction may be resorted to without departing from the invention which is defined in the appended claims and, accordingly, my invention is to be considered comprehensive of all forms of structure coming within the scope of said claims.

I claim:

1. In combination with a button blank sawing machine, having a rotatable vertically positioned arbor, said arbor having a blank cutting saw at its lower end, of a shell supporting plug movably mounted on said machine and adapted in one position to be positioned directly below said saw, a shaft mounted at one side of the arbor, a dressing tool fixed to the lower end of the shaft, said plug being brought directly below said tool when moved away from below the saw, means for manually moving said shaft with the attached dressing tool in a downward direction, and driving gearing on the arbor and shaft located so as to be brought into driving engagement with each other when said shaft and dressing tool are moved in a downward direction.

2. In combination with a button blank sawing machine, having a vertically positioned and rotatably mounted arbor equipped with a blank cutting saw at its lower end, of a shaft located to one side and paralleling said arbor, a dressing tool secured to the lower end of said shaft, spring means normally tending to elevate the shaft manually operable means for moving the shaft in a downward direction, pulleys on said arbor and shaft adapted to be brought into driving engagement on downward movement of the shaft, and a shell supporting plug mounted on the machine for movements about a vertical axis between two extreme positions, in one of which the plug is directly below the saw and in the other directly below the dressing tool on said shaft.

3. The combination with a button blank sawing machine having a rotatable vertically positioned arbor, said arbor having a blank cutting saw at its lower end, of a shell supporting plug movably mounted on said machine and adapted in one position to be located directly below said saw, a vertically movable dressing tool rotatable on a vertical axis located at one side of said arbor, said plug being brought directly below said tool when moved away from below the saw, means for rotating said dressing tool said means being moved into operative position when the dressing tool is lowered and moved out of operative position when the dressing tool is raised, said means being yieldable to permit downward movement of the dressing tool beyond the point where the driving means comes into operative position whereby said dressing tool has a considerable range of vertical movement while the driving means is in operative position.

4. The combination with a button blank sawing machine having a rotatable vertically positioned arbor, said arbor having a blank cutting saw at its lower end, of a shell supporting plug movably mounted on said machine and adapted in one position to be located directly below said saw, a vertically movable dressing tool rotatable on a vertical axis located at one side of said arbor, said plug being brought directly below said tool when moved away from below the saw, a rotated disk having considerable lateral flexability in the direction of its axis, a driven member associated with said dressing tool and vertically movable therewith, said driven member being engageable with said flexible disk upon downward movement of the dressing tool and disengageable therefrom upon upward movement of the same.

In testimony whereof I affix my signature.

WARREN E. KNOTT.